United States Patent [19]

Mogler et al.

[11] Patent Number: 5,098,060

[45] Date of Patent: Mar. 24, 1992

[54] PINCHCOCK

[75] Inventors: Joachim Mogler, Austrasse 34-36, D-7100 Heilbronn; Klaus Gaul, Kirchhardt; Gerd Swaczyna, Untereisesheim; Helmut Wiedmann, Heilbronn, all of Fed. Rep. of Germany

[73] Assignee: Joachim Mogler, Heilbronn, Fed. Rep. of Germany

[21] Appl. No.: 718,547

[22] Filed: Jun. 20, 1991

[30] Foreign Application Priority Data

Jun. 22, 1990 [DE] Fed. Rep. of Germany ....... 4019889

[51] Int. Cl.[5] .............................................. F16K 7/06
[52] U.S. Cl. ...................................... 251/7; 604/250; 251/251; 137/636.1
[58] Field of Search ............... 251/4, 6, 7, 251; 137/636.1; 604/246, 247, 248, 249, 250

[56] References Cited

U.S. PATENT DOCUMENTS

| 2,660,395 | 11/1953 | Mair et al. | 251/6 |
|---|---|---|---|
| 3,410,517 | 11/1968 | Wall | 251/6 |
| 4,307,868 | 12/1981 | Morin | 251/6 |
| 4,372,345 | 2/1983 | Mehus | 251/6 X |
| 4,786,028 | 11/1988 | Hammond | 251/7 |

FOREIGN PATENT DOCUMENTS

| 533899 | 9/1931 | Fed. Rep. of Germany | 251/6 |
|---|---|---|---|
| 7029750 | 8/1970 | Fed. Rep. of Germany | |
| 254236 | 2/1988 | Fed. Rep. of Germany | |
| 368352 | 2/1959 | Switzerland | |

Primary Examiner—Martin P. Schwadron
Assistant Examiner—Kevin L. Lee
Attorney, Agent, or Firm—Shenier & O'Connor

[57] ABSTRACT

A pinchcock comprises a housing, a tube section of elastically flexible material arranged in the housing, a pinching element displaceable in the housing in a direction extending transversely to the longitudinal axis of the tube section and engaging on the outer side of the tube section and an actuating member for displacing the pinching element. The housing is designed as a plastic molded part, in which a ball is displaceable, as pinching element, in the direction extending transversely to the longitudinal axis of the tube section. The actuating member comprises a cam engaging the ball, this cam being rotatable about an axis aligned at right angles to the longitudinal axis of the tube section and to the direction of displacement of the ball.

6 Claims, 2 Drawing Sheets

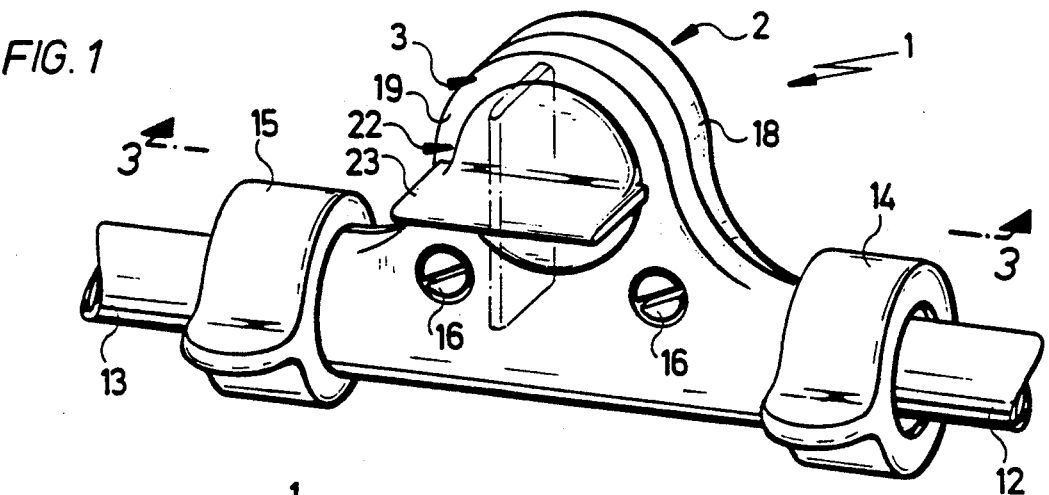
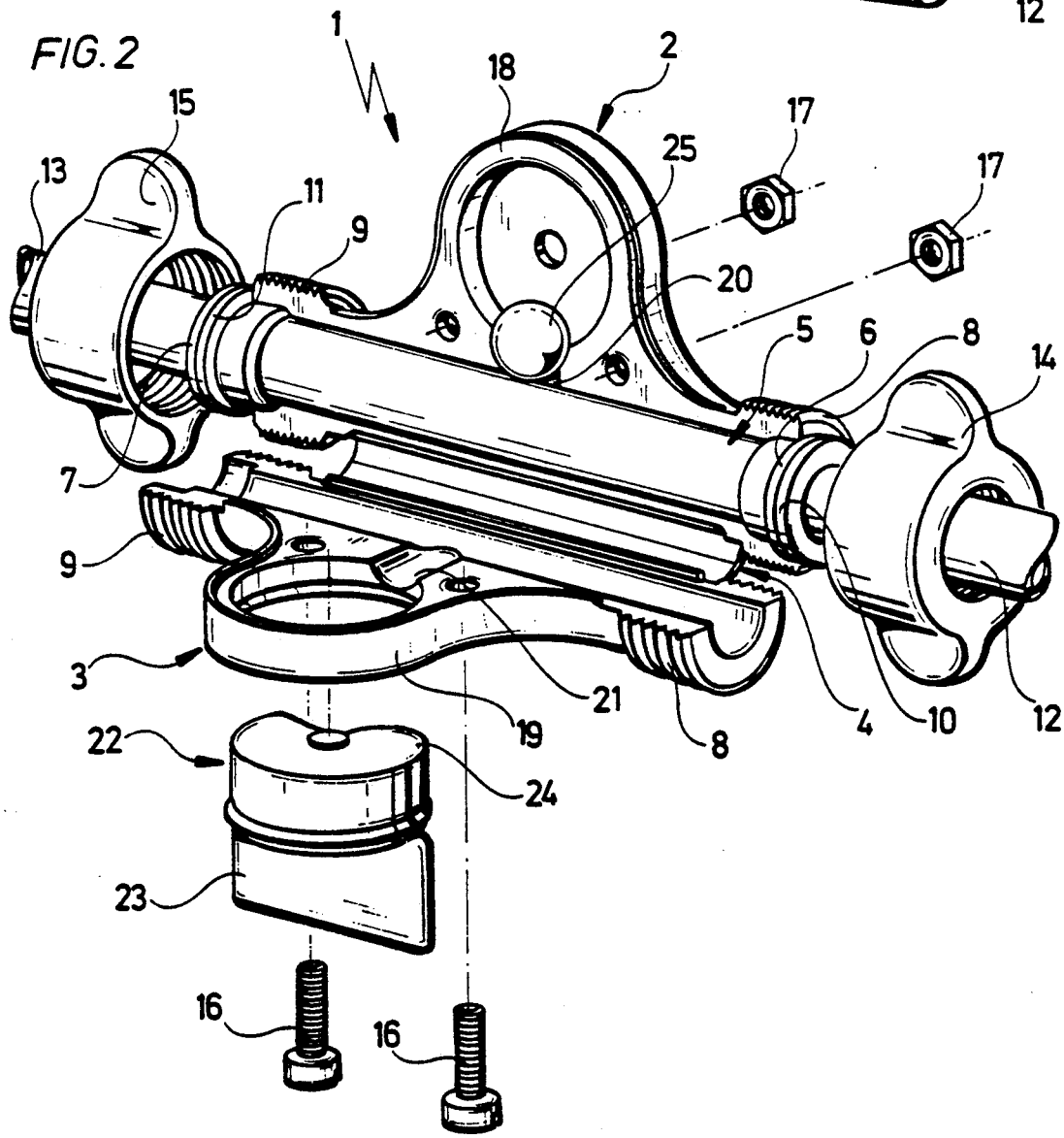

PINCHCOCK

The invention relates to a pinchcock according to the preamble to patent claim 1.

A pinchcock of this type is known from CH-PS 368 352. The known pinchcock is attached to a continuous tube section. It is not possible to connect this pinchcock to connection pipes.

Pinchcocks having housings made of metal or plastic and a ball as pinching element are known from DE-GM 70 29 750 and DD-PS 254 236. In both cases, production of the pinchcock, in particular its housing, requires considerable resources and expense. It is also possible to connect these pinchcocks to connection pipes only by using special sealing and connection means.

The object of the invention is to improve a generic pinchcock such that it can be produced in a simple manner and connected with connection pipes.

The object is accomplished in accordance with the invention by the features specified in the characterizing clause of patent claim 1.

The following description of a preferred embodiment of the invention serves to explain the invention in greater detail in conjunction with the attached drawings, in which:

FIG. 1 is a diagrammatic view of a pinchcock;

FIG. 2 is an exploded illustration of the pinchcock of FIG. 1;

Figure 3:
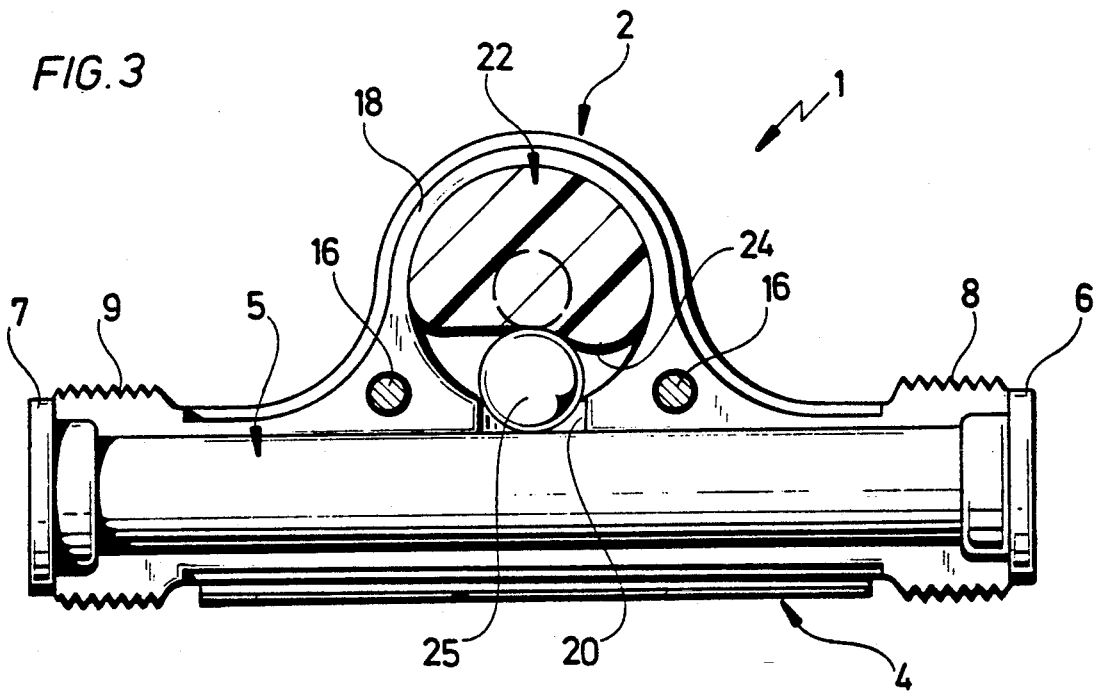
FIG. 3 is a sectional view of the pinchcock of FIGS. 1 and 2 in its open position.

As shown in the drawings, a pinchcock, which can be utilized, in particular, in pipes for beer or other carbonated beverages, comprises a housing consisting of two essentially mirror-inverted, plastic molded parts 2 and 3, whereby the parts 2 and 3 are hingedly connected with one another by a conventional film hinge 4 (=integrally molded hinge) (FIG. 2). The plastic molded parts 2, 3 enclose an elastically flexible tube section 5 which is also designed as a molded part, for example made of silicon rubber material, and has a flange 6 and 7, respectively, at each of its ends. The flanges 6, 7 fit into corresponding end sections 8 and 9, respectively, of the housing which are provided with external threads. Corresponding flanges 10, 11 of pipes 12, 13 are aligned with the flanges 6, 7 and connected therewith with the aid of screw members 14, 15, which fit onto the external threads of the end sections 8, 9, so as to be liquid and gas tight. Since the tube section 5 and its flanges 6, 7 consist of elastically flexible material, e.g. silicon rubber, the use of special intermediate washers can normally be dispensed with. Once the two plastic molded parts 2 and 3 have been brought together from the position illustrated in FIG. 2 into the position according to FIG. 1, these two parts, 2, 3 which enclose the tube section 5 are securely connected with one another by screws 16 and nuts 17.

Figure 4:
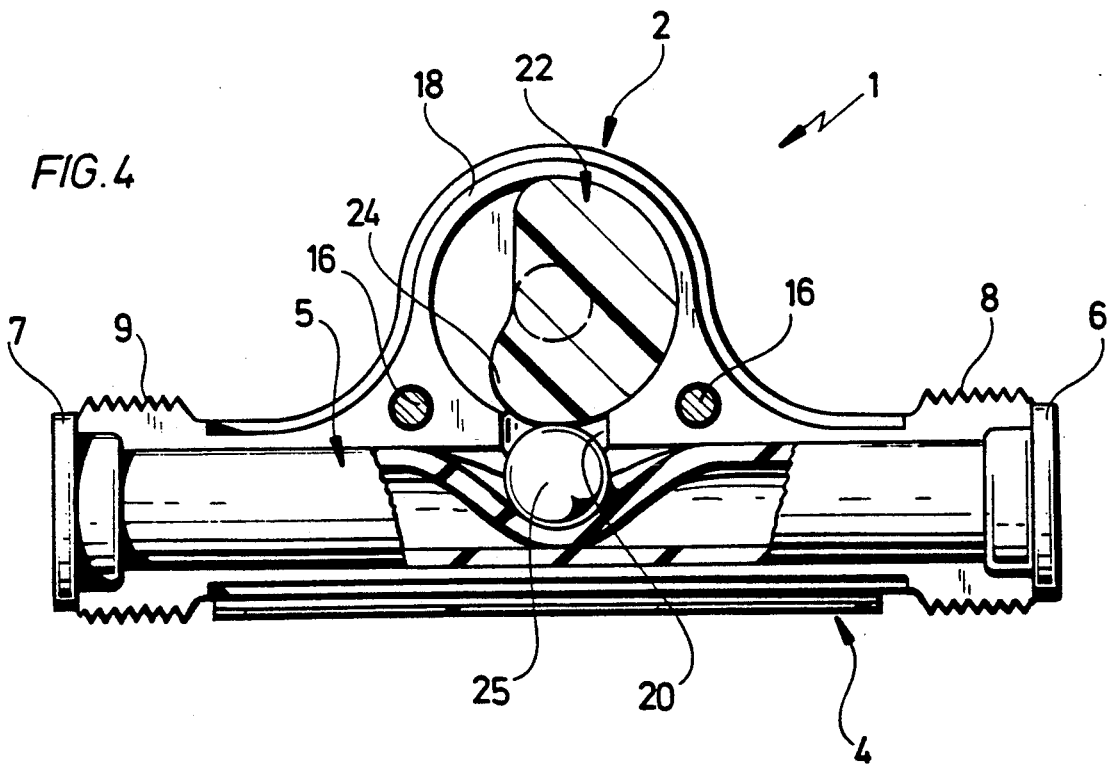
FIG. 4 is a sectional view of the pinchcock of FIGS. 1 and 2 in its closed position.

The two housing parts 2, 3 each comprise a radially extending enlarged member 18 and 19, respectively. The outer and inner contours of these enlarged members are essentially identical. A ball 25, for example a conventional ball bearing ball made of steel, is displaceable as pinching element in guideways 20, 21 of the enlarged members 18, 19 in a direction extending transversely to the longitudinal axis of the tube section 5. A complementary actuating member 22 is rotatably inserted into a circular-cylindrical recess in the enlarged members 18, 19. This actuating member comprises a handle 23 on its outer side and a cam 24 on its inner side which is pivotable about the axis of rotation of the member and the operative contour of which is best seen in FIGS. 3 and 4. The actuating member 22 is also designed, with the handle 23 and the cam 24, as a plastic molded part. The rotatable mounting of the actuating member 22 in the enlarged members 18, 19 is brought about in that it is snapped into place in one of these enlarged members, for example the enlarged member 19.

When the actuating member 22 is rotated about its axis of rotation, which is aligned at right angles to the longitudinal axis of the tube section and to the direction of displacement of the ball 25, the cam 24 engages on the ball 25 in the manner shown in FIGS. 3 and 4. In FIG. 3, the ball 25 takes up its one end position, in which it is held by the elastic biasing force of the wall of the tube section 5. When the cam 24 is rotated into the position shown in FIG. 4, it forces the ball 25 inwards along its path of displacement so that the ball presses one wall of the tube section 5 against the opposite wall and hereby tightly closes the cock. When the cam 24 is turned back into the position shown in FIG. 3, the wall of the tube section 5 abutting against the ball 25 gives way elastically and takes the ball 25 back into its original position.

As illustrated in FIGS. 3 and 4, it is necessary to rotate the cam 24 merely through about 90° to move the pinchcock from its open position (FIG. 3) into its closed position (FIG. 4) and vice versa.

The material of the tube section 5 is advantageously protected from wear and tear by inserting the ball 25 between cam 24 and tube section 5. This would not occur if the moving cam 24 were to engage directly on the tube section 5 in an abrading manner. In principle, however, it would be conceivable, by accepting this disadvantage, to have the cam 24 engaging directly on the tube section 5.

The present disclosure relates to the subject matter disclosed in German application No. P 40 19 889.8 of June 22, 1990, the entire specification of which is incorporated herein by reference.

What is claimed is:

1. A pinchcock comprising a housing, a tube section of elastically flexible material arranged in the housing, a pinching element displaceable in the housing in a direction extending transversely to the longitudinal axis of the tube section and engaging on the outer side of the tube section, an actuating member for displacing the pinching element and a cam arranged on the actuating member and engaging on the pinching element, said cam being rotatable about an axis aligned at right angles to the longitudinal axis of the tube section and to the direction of displacement of the pinching element, characterized in that the pinching element is a ball (25), that the housing consists of two substantially mirror-inverted, plastic molded parts (2, 3) and the cam (24) which is also designed as a plastic molded part is rotatably mounted in the one molded part (3) of the housing, that the tube section (5) which is also designed as a molded part has sealing flanges (6, 7) at its ends, that these sealing flanges (6, 7) fit into corresponding end sections (8, 9) of the plastic molded parts (2, 3), said end sections being provided with external threads, and that flanges (10, 11) of connection pipes (12, 13) are adapted to be directly connected to the sealing flanges (6, 7) so as to be liquid and gas tight by way of screw members (14, 15) fitting onto the external threads of the end sections (8, 9).

2. Pinchcock as defined in claim 1, characterized in that the two plastic molded parts (2, 3) are hingedly connected with one another by a film hinge (4).

3. Pinchcock as defined in claim 1, characterized in that the actuating member (22) with the cam (24) is rotatably engaged in the one plastic molded part (3) of the housing.

4. Pinchcock as defined in claim 1, characterized in that a handle (23) is integrally formed on the actuating member (22).

5. Pinchcock as defined in claim 1, characterized in that it is adapted to be brought from its closed into its open position and vice versa by a rotary movement of the cam (24) through approximately 90°.

6. Pinchcock as defined in claim 1, characterized in that the tube section (5) consists of silicon material.

* * * * *